Figure 1:
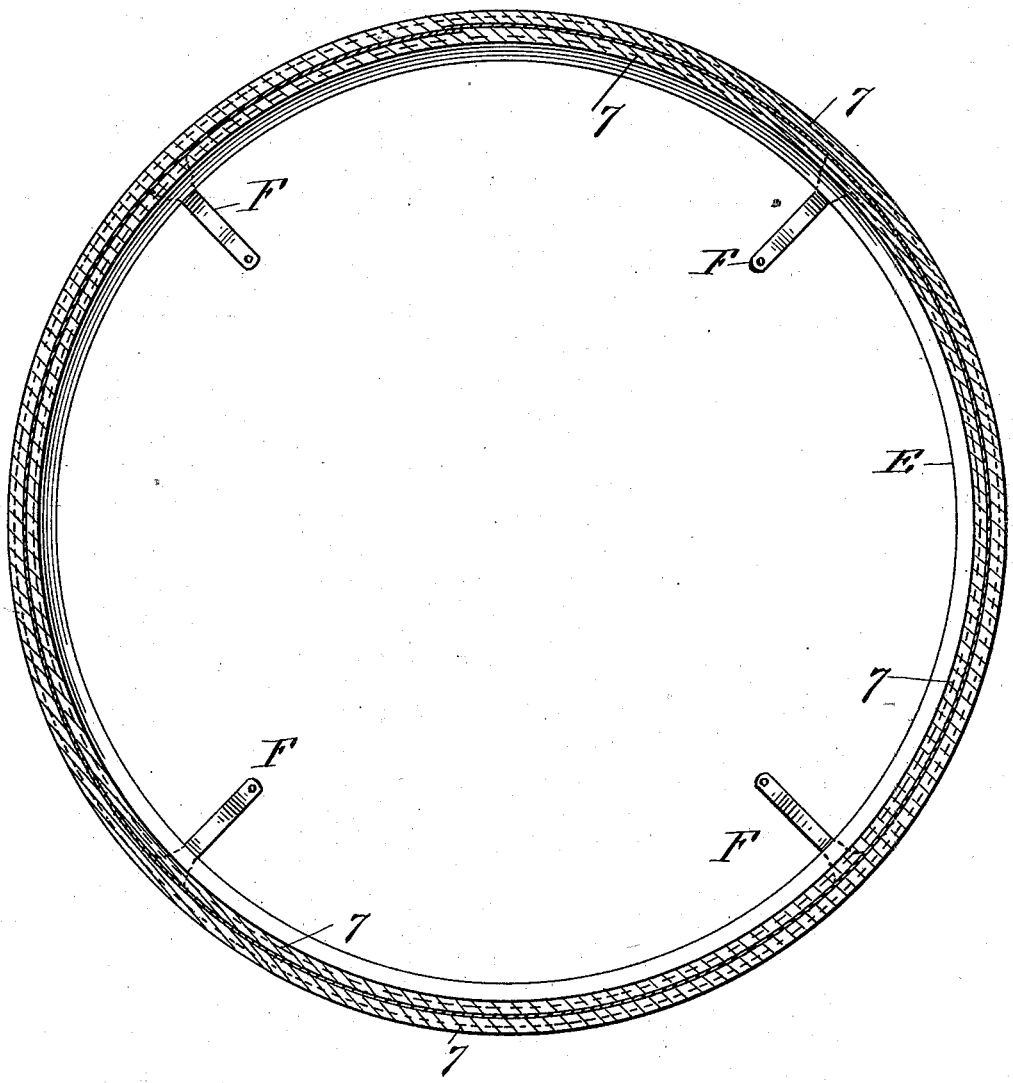

(No Model.) 2 Sheets—Sheet 1.

C. W. TWIST.
ARMOR FOR PNEUMATIC TIRES.

No. 559,152. Patented Apr. 28, 1896.

Witnesses:

Inventor:
Charles W. Twist.
by Chapin & Co.
Attorneys.

(No Model.) 2 Sheets—Sheet 2.
C. W. TWIST.
ARMOR FOR PNEUMATIC TIRES.
No. 559,152. Patented Apr. 28, 1896.
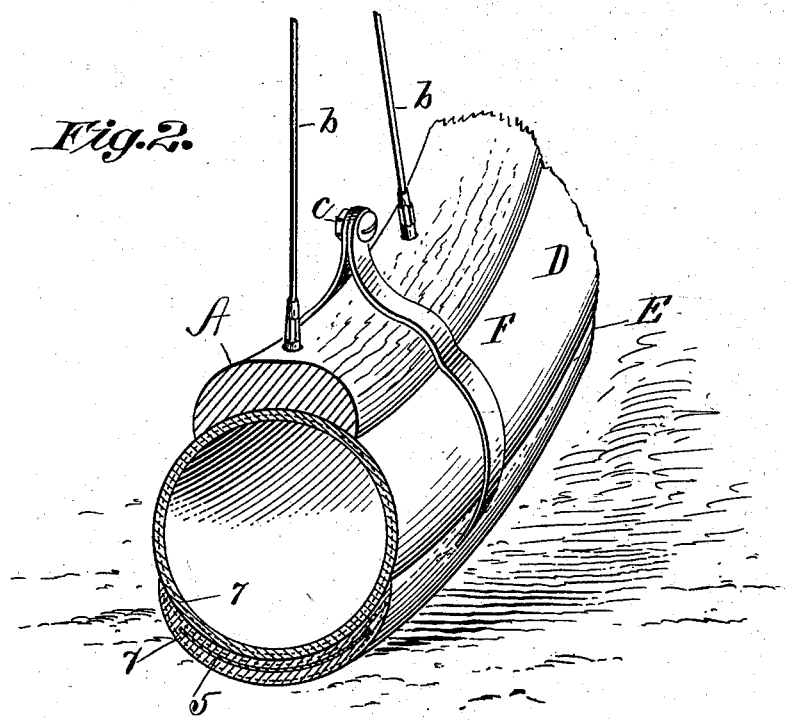
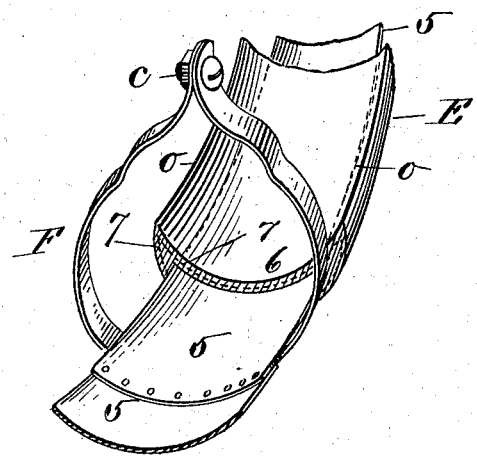

UNITED STATES PATENT OFFICE.

CHARLES W. TWIST, OF SPRINGFIELD, MASSACHUSETTS.

ARMOR FOR PNEUMATIC TIRES.

SPECIFICATION forming part of Letters Patent No. 559,152, dated April 28, 1896.

Application filed September 24, 1895. Serial No. 563,506. (No model.)

*To all whom it may concern:*

Be it known that I, CHARLES W. TWIST, a citizen of the United States of America, residing at Springfield, in the county of Hampden and State of Massachusetts, have invented new and useful Improvements in Armor for Pneumatic Tires, of which the following is a specification.

This invention relates to bicycles and analogous vehicles, and has reference particularly to an improved construction of protecting-armor for the pneumatic tires of vehicles, whereby the puncturing of the same in use is prevented; and the invention consists in the peculiar construction of said armor devices, all as hereinafter fully described, and more particularly pointed out in the claim.

In the drawings forming part of this specification, Figure 1 is a sectional view of an armor for pneumatic tires constructed according to my invention, this figure illustrating portions of devices which may be employed for more securely attaching the armor to the pneumatic tire and wheel-rim. Fig. 2 is a perspective view of a section of a wheel-rim of a pneumatic tire and of the said armor applied to the latter, this view showing one of the said armor-securing devices in operative position. Fig. 3 is a perspective view illustrating the details of the construction of said armor, as hereinafter fully described, and of one of said fastening devices applied to the armor as in practice.

In the drawings, A is the rim of a wheel, of which $b\ b$ are portions of the spokes thereof.

D is the pneumatic tire, of the usual or any suitable construction, and E indicates the armor applied to said tire D. F indicates a metallic band which may be used for encircling the said armor and the tire and rim of the wheel, as illustrated in Fig. 2, when occasion may demand its use, as below described. The ends of said metallic band are secured together, as shown in Fig. 3, by a bolt and nut $c$, or by other suitable means. The said pneumatic tire D may be of any of the well-known constructions embodying, as is usual in a tube of rubber, the requisite characteristics for containing air under pressure, whereby it is inflated and constitutes a yielding tire.

It is well known that pneumatic tires are constantly subjected to serious injury by becoming punctured by contact with sharp objects while in use on a road, and the object of this invention is to provide a protecting-armor for said tire D which shall prevent effectually such puncturing, and at the same time which shall be of such elastic or yielding formation that it shall act with all requisite elastic freedom that is desired in the tire itself, to the end that the armor and the tire act in perfect unanimity elastically. The said armor E consists of a band of metal 5, of suitable width to securely cover the tread portion of the tire D, and concaved from one end to the other thereof to correspond to the convexity of the tire to which it is to be applied, said band being of sufficient length to entirely encircle said tire and having its ends riveted or otherwise permanently united, as shown in Fig. 3, to the end that it constitutes a continuous metallic band having an unbroken surface throughout, together with a covering of resilient material 6, such as rubber, which entirely incloses the said metallic band 5, as shown in the drawings, said resilient material 6 having borders $o\ o$, which, by the concave form of said armor-band, extend more or less upwardly on the sides of the said tire D. The said band-embedding material 6, being of a resilient nature, permits a perfect freedom of action of the band 5, as to deflection, in consonance with such action of the pneumatic tire D under the pressure of the weight of the vehicle or its contents when running over uneven surfaces on a road. Said band is preferably embedded in said resilient material so as to leave the greater thickness of said material on the outside of the band and only a sufficient amount on the inside between the band and the tire D of the wheel as to effectually protect the band and afford a better frictional contact between the adjacent surfaces of the armor-band and the tire than would be obtained between an exposed metal surface and said tire. If desired, there may be inserted in said resilient material, between one or both of its outer surfaces and the said metallic band 5, a strip or strips of canvas 7, as indicated in dotted line in Figs. 1 to 3 of the drawings, said dotted line extending, as there shown, between said metallic band and the surfaces of its embedding material 6. The said fastening devices for securing the said armor onto the tire D, which, as aforesaid, may be employed if found desirable, consist of a series of metallic strips F, passing through the said band-containing material 6, outside of said band, and extending over the sides of the tire D and having their ends united across the rim A by a screw-bolt c or other suitable device, as shown; but the armor-band is preferably used without said strips F, as the band is in that case easily removed for cleaning by partially deflating the tire. The said strips F and end-uniting bolt c are only necessary under certain conditions to the retention of the armor in proper place on the tire D, for it is found in practice that when a high pneumatic pressure can be maintained in said last-named tire and the armor E is of suitable proportionate circumference relative to the circumference of that portion of the tire D on which the armor has its place the expansive power possessed by the tire D causes such an adhesion of the armor to the tire that said armor remains fixedly in place on said tire without the use of said fastening devices.

Having thus described my invention, what I claim, and desire to secure by Letters Patent, is—

An armor for a pneumatic tire for vehicle-wheels, consisting of a continuous band of metal having an unbroken surface throughout inclosed in a resilient substance which constitutes the tread portion of a tire to which it is applied, and a layer of textile material embedded in said resilient substance intermediately of said band, and the outer surface of said resilient substance, said armor being adapted to encircle an inflated tire combined with the clips F, integral with the said metal band, for removably securing said armor to the rim of the wheel, substantially as set forth.

CHARLES W. TWIST.

Witnesses:
WM. H. CHAPIN,
K. I. CLEMONS.